United States Patent [19]
James et al.

[11] Patent Number: 6,161,850
[45] Date of Patent: Dec. 19, 2000

[54] BIG GAME GURNEY

[76] Inventors: Cleve James; Roger James, both of 8396 Turtle La., Tobyhanna, Pa. 18466

[21] Appl. No.: 09/220,949

[22] Filed: Dec. 24, 1998

[51] Int. Cl.[7] ...................................................... B62B 1/00
[52] U.S. Cl. .................................... 280/47.18; 280/47.24; 280/7.12; 280/8
[58] Field of Search ............................. 280/47.18, 47.24, 280/47.27, 63, 7.12, 8, 7.14, 47.29, 47.3, 47.32

[56] References Cited

U.S. PATENT DOCUMENTS

| | | | |
|---|---|---|---|
| D. 257,587 | 12/1980 | Doyich | D12/21 |
| 1,560,802 | 11/1925 | Julstedt | 280/53 |
| 2,183,066 | 12/1939 | Fields | 280/53 |
| 2,494,199 | 1/1950 | Provitola et al. | 280/36 |
| 2,624,588 | 1/1953 | Jones | 280/9 |
| 2,812,950 | 11/1957 | Holloway | 280/42 |
| 4,589,668 | 5/1986 | Mares | 280/8 |
| 5,222,757 | 6/1993 | Magyar | 280/653 |
| 5,806,878 | 9/1998 | Mroczka et al. | 280/653 |
| 5,903,997 | 5/1999 | Jacob | 43/1 |
| 5,951,037 | 9/1999 | Hsieh et al. | 280/655 |

*Primary Examiner*—J. J. Swann
*Assistant Examiner*—J. Allen Shriver

[57] ABSTRACT

A collapsible game gurney system is provided including a base and a wheel assembly mounted on the base. Also included is an arm assembly having a pair of elongated arms each with an inboard end hingably mounted to the base for pivoting between a parallel orientation and an angled orientation. Next provided is a tarp removably mounted to the arm assembly for supporting game thereon.

10 Claims, 5 Drawing Sheets

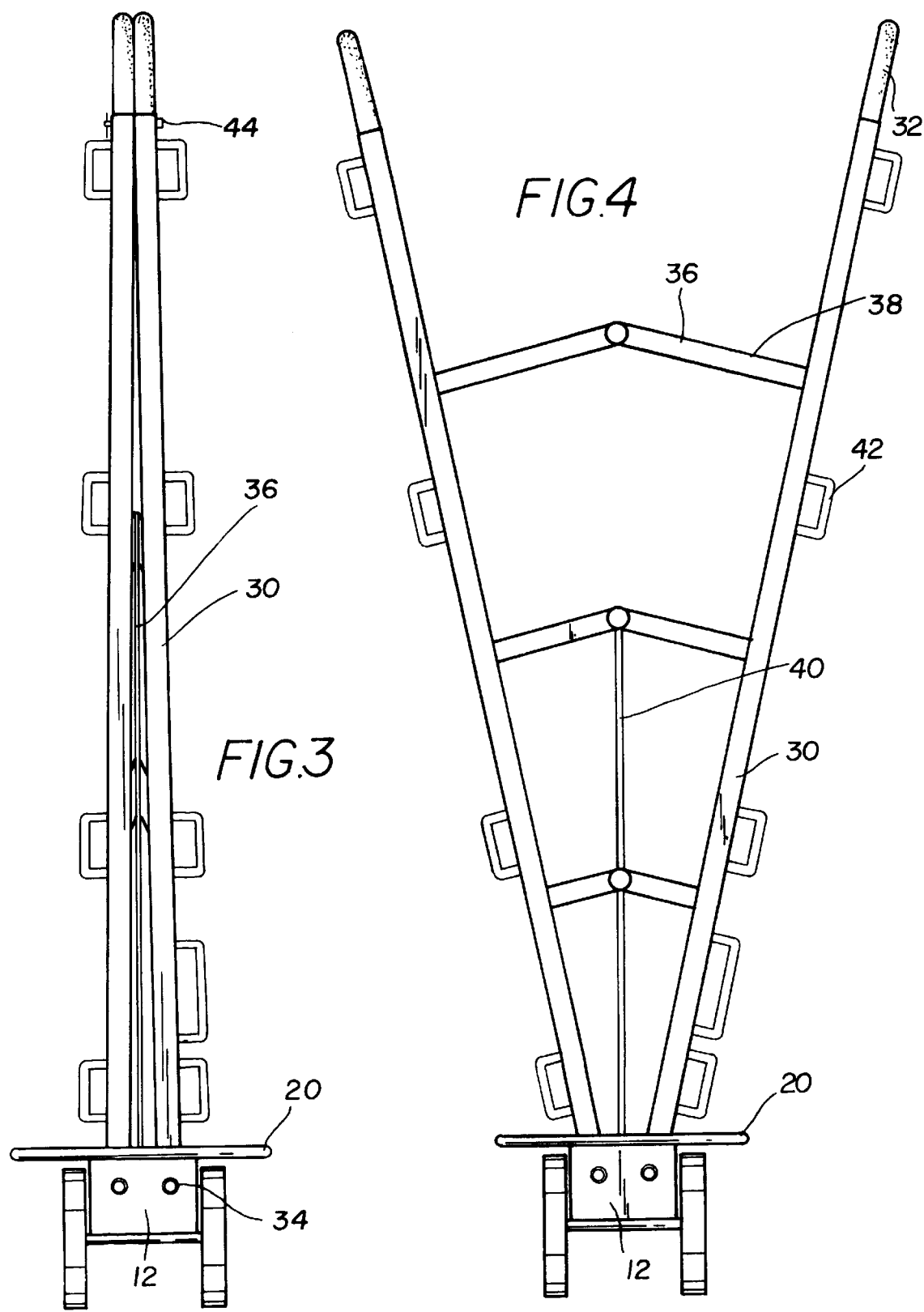

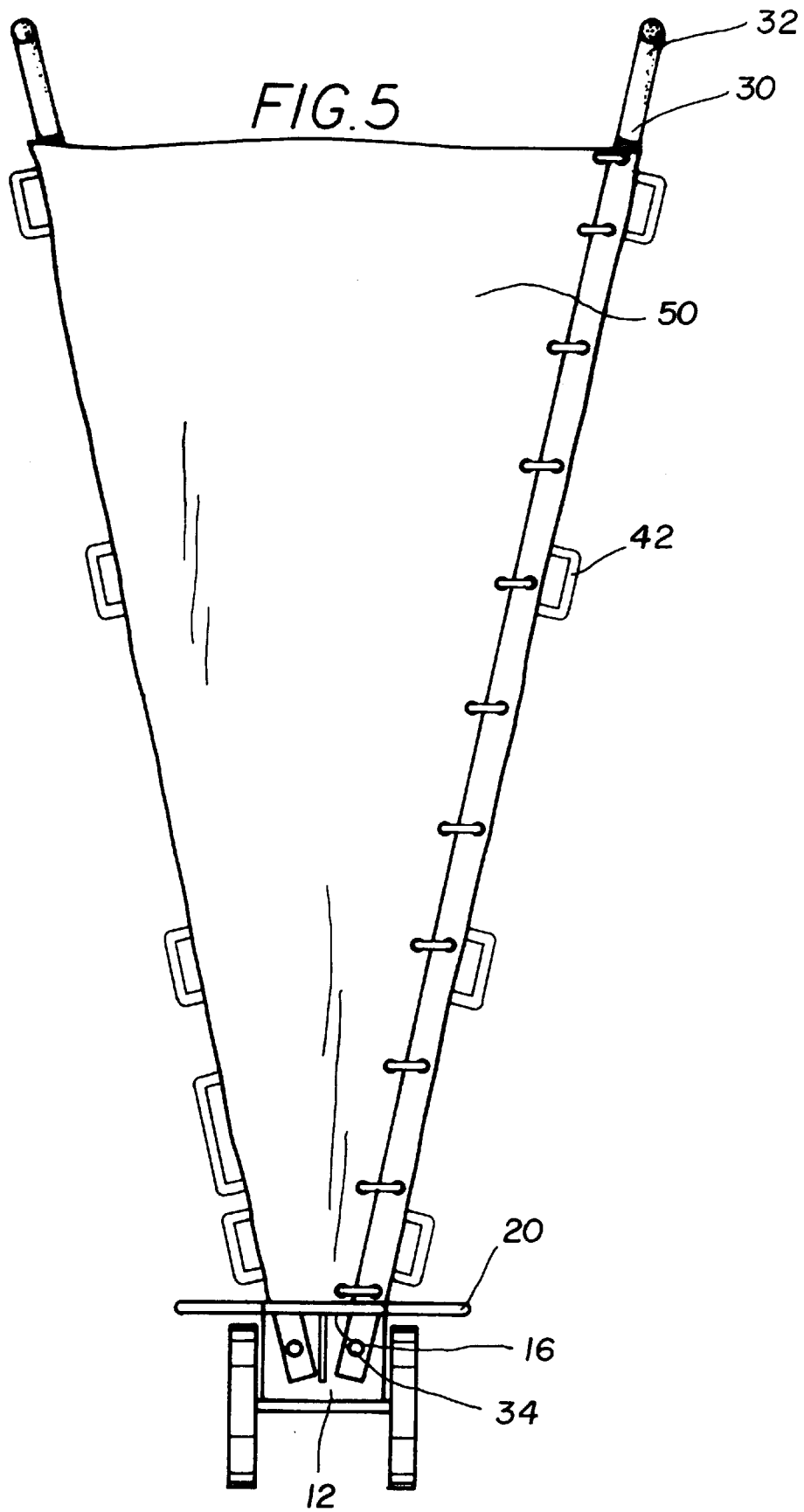

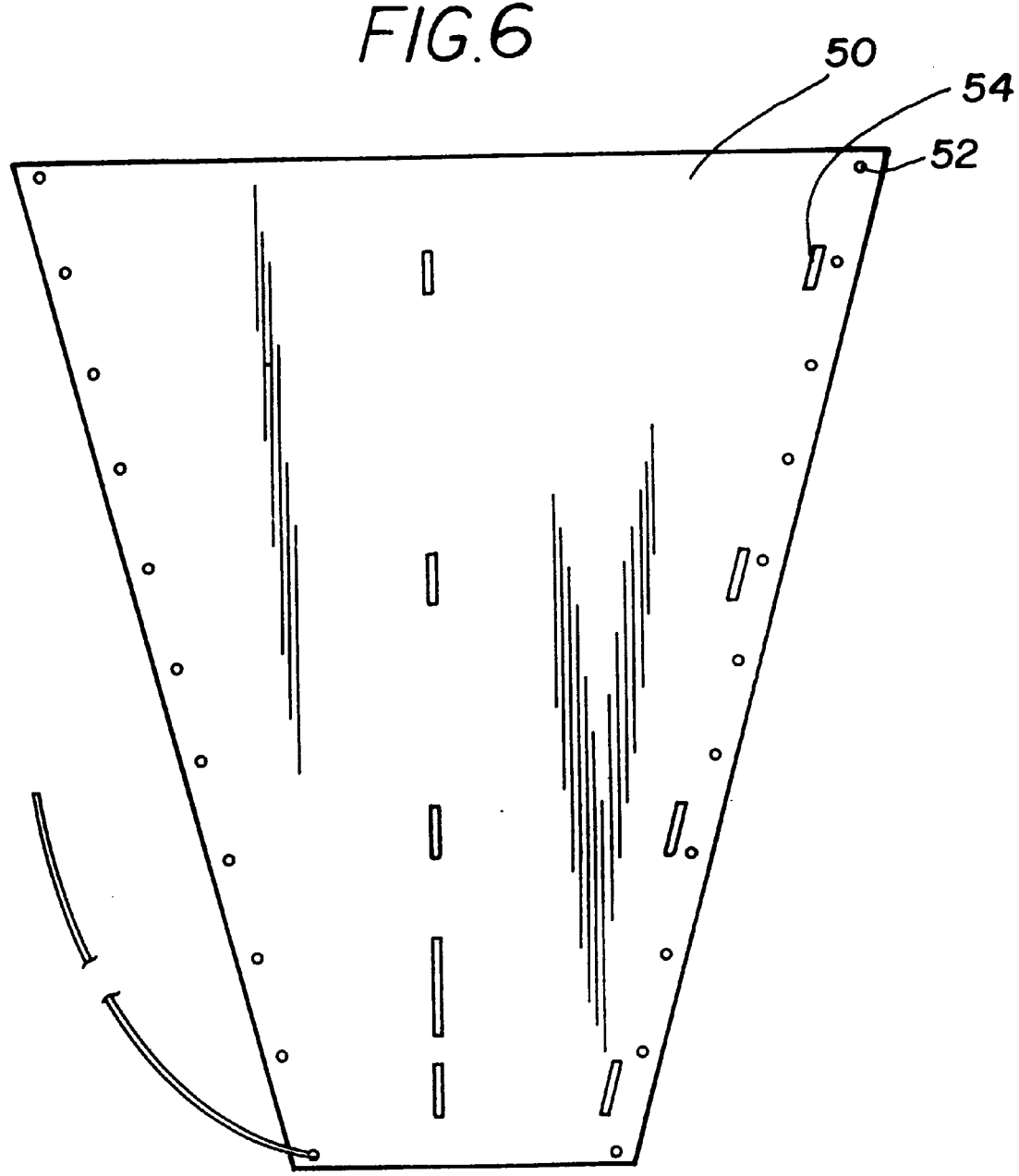

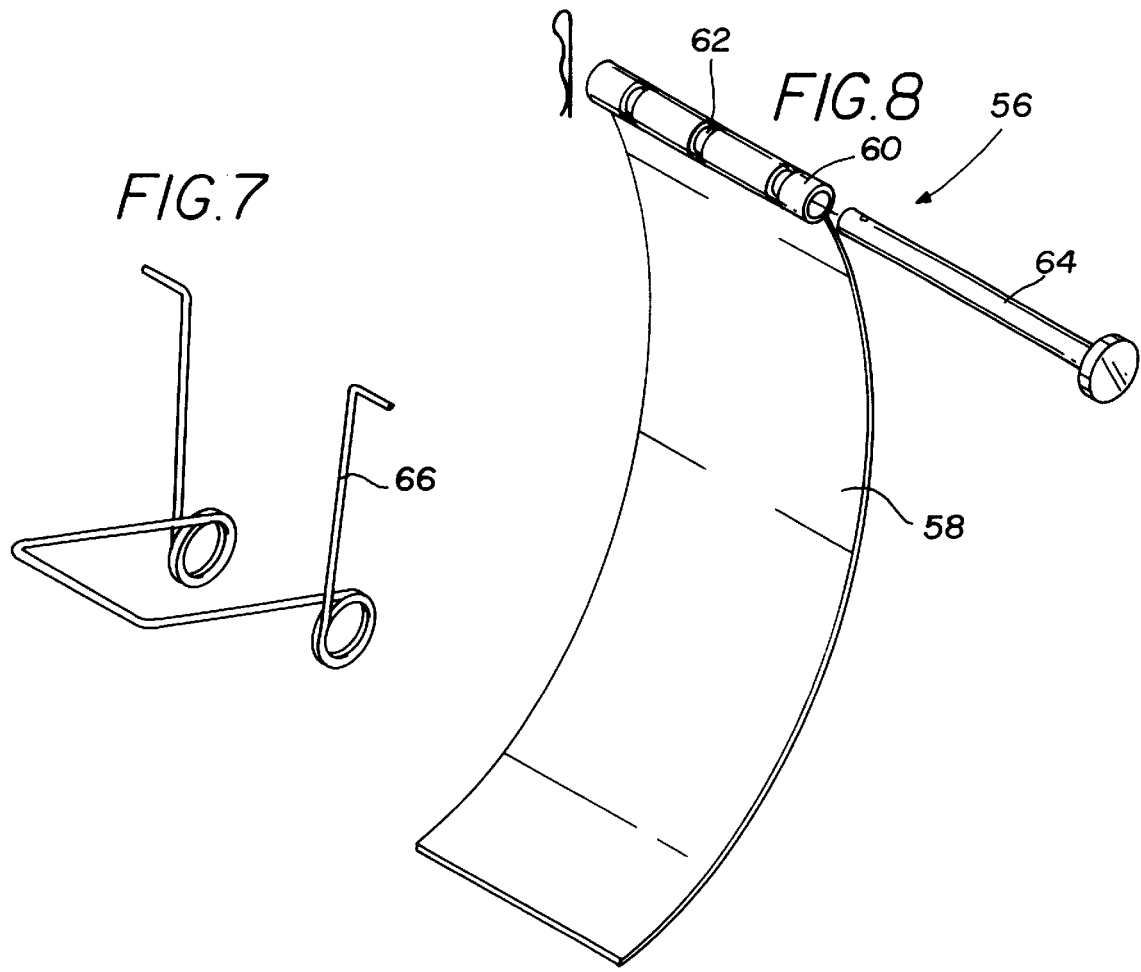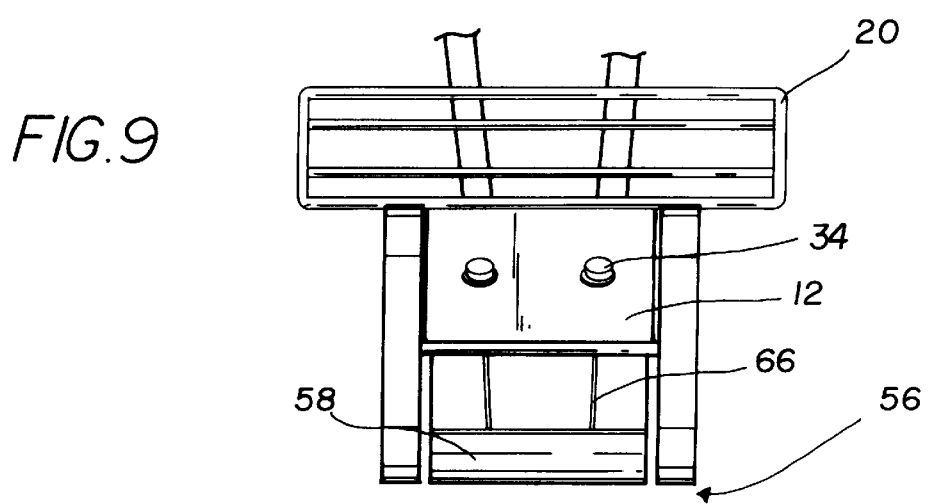

BIG GAME GURNEY

BACKGROUND OF THE INVENTION

1. Field of the Invention

The present invention relates to gurneys and more particularly pertains to a new big game gurney for transporting big game in a convenient manner.

2. Description of the Prior Art

The use of gurneys is known in the prior art. More specifically, gurneys heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,564,720; U.S. Pat. No. 4,373,737; U.S. Pat. No. 2,494,199; U.S. Pat. No. 5,222,757; U.S. Pat. No. 2,183,066; and U.S. Patent Des. 327,968.

In these respects, the big game gurney according to the present invention substantially departs from the conventional concepts and designs of the prior art, and in so doing provides an apparatus primarily developed for the purpose of transporting big game in a convenient manner.

SUMMARY OF THE INVENTION

In view of the foregoing disadvantages inherent in the known types of gurneys now present in the prior art, the present invention provides a new big game gurney construction wherein the same can be utilized for transporting big game in a convenient manner.

The general purpose of the present invention, which will be described subsequently in greater detail, is to provide a new big game gurney apparatus and method which has many of the advantages of the gurneys mentioned heretofore and many novel features that result in a new big game gurney which is not anticipated, rendered obvious, suggested, or even implied by any of the prior art gurneys, either alone or in any combination thereof.

To attain this, the present invention generally comprises a base plate with a substantially planar square configuration defined by a top face, a bottom face and a periphery formed therebetween. The periphery is defined by a front edge, a rear edge and a pair of side edges. As shown in FIG. 2, the bottom face has a pair of posts coupled thereto adjacent to the rear edge and opposite side edges. A cross bar is coupled between ends of the post for defining a channel for reasons that will soon become apparent. Next provided is a support rack including a rectangular frame defined by a pair of elongated bars and a pair of short bars. The support rack further includes a plurality of elongated cross members coupled between the short bars in parallel relationship. One of the elongated bars of the support rack is coupled at a central extent thereof to the top face of the base plate along the rear edge thereof. Such support rack extends outwardly from the base in perpendicular relationship therewith, as best shown in FIG. 1. Ideally, the support rack has a length which is three times that of the base plate. Note FIGS. 3–5. A wheel assembly is provided including a hollow conduit coupled along the front edge of the base plate. Rotatably mounted within the conduit is an axle. A pair of wheels are coupled to ends of the axle for rotating therewith. Further, the wheels each have a diameter less than that of the base plate. An arm assembly includes a pair of elongated arms each having a square cross-section along a length thereof. Such arms each have an outboard end with a handle mounted thereon and an inboard end. Such inboard end is hingably coupled to a pin extending from the bottom face of the base plate. As such, the arm extends through the channel. The arm assembly further includes a plurality of braces. As shown in FIG. 4, such braces each have a pair of linear rigid portions hingably coupled at first ends thereof. Further, second ends of the arms are each hingably coupled to one of the arms for pivoting with the arms and remaining in coplanar relationship therewith. A central shaft is coupled between centers of the braces and extend through the channel. A plurality of U-shaped handles are mounted along outer surfaces of the arms. In use, the arms are adapted to pivot between a parallel orientation and an angled orientation, thereby forming an acute angle. The arm assembly further includes a locking pin for being removably secured within bores formed in the outboard ends of the arms for maintaining the same in the parallel orientation. FIGS. 5 & 6 show a tarp having a generally planar triangular configuration. The tarp includes a pair of beveled side edges. A plurality of linearly aligned and equally spaced grommets are formed in the tarp along the side edges. Further, a plurality of rectangular cut outs formed in the tarp along one of the beveled side edges and along a center bisecting line of the tarp. The tarp is adapted for being folded over the arms when in the angled orientation. As such, the cut outs receive the U-shaped handles of the arm assembly and the beveled side edges are connected via a piece of twine which is positioned through the grommets. Finally, a sled assembly is removably mounted to the bottom face of the base plate and extends between the wheels for use in snow.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new big game gurney apparatus and method which has many of the advantages of the gurneys mentioned heretofore and many novel features that result in a new big game gurney which is not anticipated, rendered obvious, suggested, or even implied by any of the prior art gurneys, either alone or in any combination thereof.

It is another object of the present invention to provide a new big game gurney which may be easily and efficiently manufactured and marketed.

It is a further object of the present invention to provide a new big game gurney which is of a durable and reliable construction.

An even further object of the present invention is to provide a new big game gurney which is susceptible of a low cost of manufacture with regard to both materials and labor, and which accordingly is then susceptible of low prices of sale to the consuming public, thereby making such big game gurney economically available to the buying public.

Still yet another object of the present invention is to provide a new big game gurney which provides in the apparatuses and methods of the prior art some of the advantages thereof, while simultaneously overcoming some of the disadvantages normally associated therewith.

Still another object of the present invention is to provide a new big game gurney for transporting big game in a convenient manner.

Even still another object of the present invention is to provide a new big game gurney that includes a base and a wheel assembly mounted on the base. Also included is an arm assembly having a pair of elongated arms each with an inboard end hingably mounted to the base for pivoting between a parallel orientation and an angled orientation. Next provided is a tarp removably mounted to the arm assembly for supporting game thereon.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a top view of the present invention with the arms in a collapsed orientation.

FIG. 4 is a top view of the present invention with the arms in an angled orientation.

FIG. 5 is a top view of the present invention with the arms in the angled orientation and the tarp thereon.

FIG. 6 is a top view of the of the tarp present invention.

FIG. 7 is a perspective view of the spring associated with the sled of the present invention.

FIG. 8 is a perspective view of the resilient member of the sled.

FIG. 9 is a front view of the present invention with the sled attached.

DESCRIPTION OF THE PREFERRED EMBODIMENT

Figure 1:
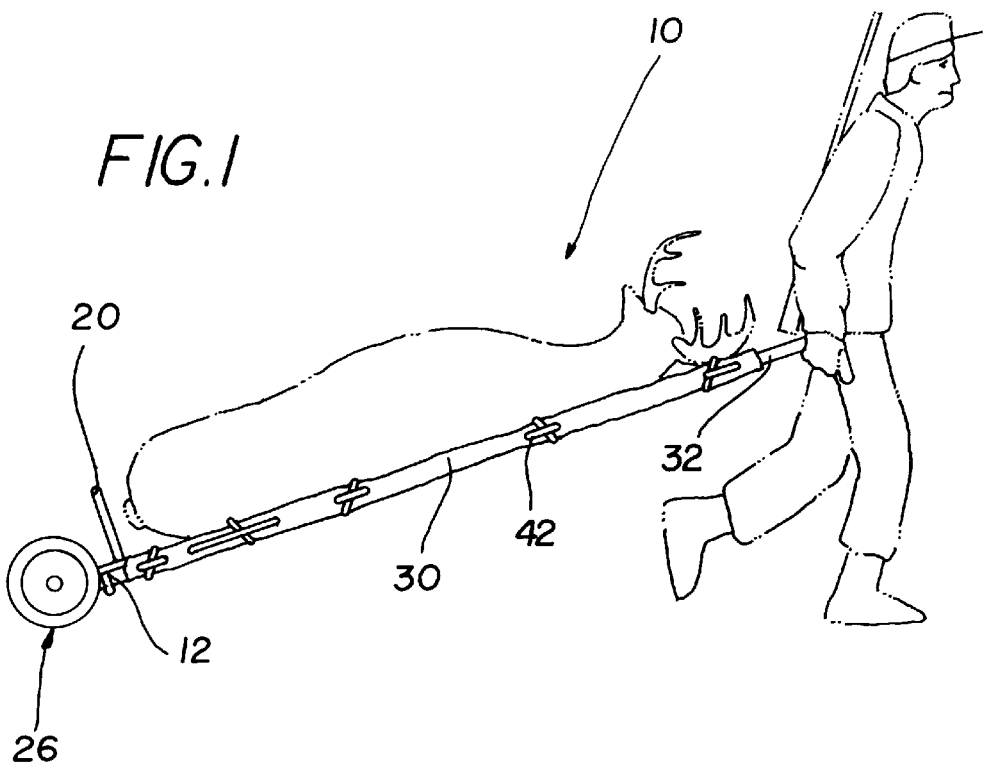
FIG. 1 is a side view of a new big game gurney according to the present invention.

With reference now to the drawings, and in particular to FIGS. 1 through 9 thereof, a new big game gurney embodying the principles and concepts of the present invention and generally designated by the reference numeral 10 will be described.

Figure 2:
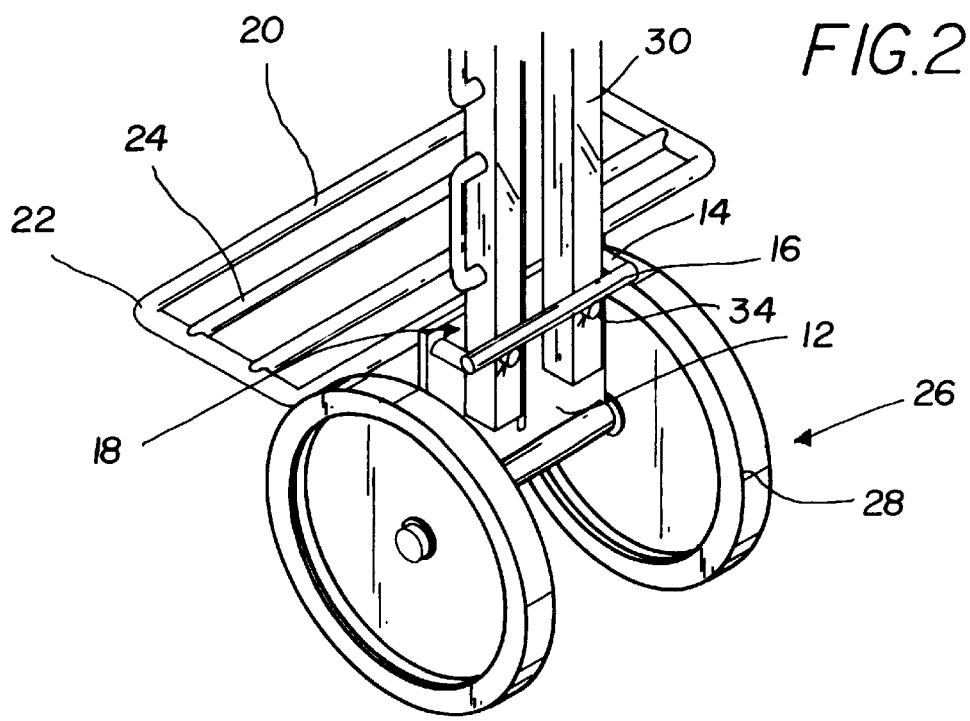
FIG. 2 is a perspective view of the rack, base plate, and wheel assembly of the present invention.

The present invention, designated as numeral 10, includes a base plate 12 with a substantially planar square configuration defined by a top face, a bottom face and a periphery formed therebetween. The periphery is defined by a front edge, a rear edge and a pair of side edges. As shown in FIG. 2, the bottom face has a pair of posts 14 coupled thereto adjacent to the rear edge and opposite side edges. A cross bar 16 is coupled between ends of the post for defining a channel 18 for reasons that will soon become apparent.

Next provided is a support rack 20 including a rectangular frame 22 defined by a pair of elongated bars and a pair of short bars. The support rack further includes a plurality of elongated cross members 24 coupled between the short bars in parallel relationship. One of the elongated bars of the frame of the support rack is coupled at a central extent thereof to the top face of the base plate along the rear edge thereof. Such support rack extends outwardly from the base in perpendicular relationship therewith, as best shown in FIG. 1. Ideally, the support rack has a length which is three times that of the base plate. Note FIGS. 3–5.

A wheel assembly 26 is provided including a hollow conduit coupled along the front edge of the base plate. Rotatably mounted within the conduit is an axle. A pair of wheels 28 are coupled to ends of the axle for rotating therewith. Further, the wheels each have a diameter less than that of the base plate.

An arm assembly includes a pair of elongated arms 30 each having a square cross-section along a length thereof. Such arms each have an outboard end with a handle 32 mounted thereon and an inboard end. Such inboard end is hingably coupled to a pin 34 extending from the bottom face of the base plate. As such, the arm extends through the channel.

The arm assembly further includes a plurality of braces 36. As shown in FIG. 4, such braces each have a pair of linear rigid portions 38 hingably coupled at first ends thereof. Further, second ends of the arms are each hingably coupled to one of the arms for pivoting with the arms and remaining in coplanar relationship therewith. It should be noted that the braces have lengths which increase from inboard ends of the arms to outboard ends of the arms. A central shaft 40 is coupled between centers of the braces and extend through the channel. Further, a plurality of U-shaped handles 42 are mounted along outer surfaces of the arms.

In use, the arms are adapted to pivot between a parallel orientation and an angled orientation, thereby forming an acute angle. The arm assembly further includes a locking pin 44 for being removably secured within bores formed in the outboard ends of the arms for maintaining the same in the parallel orientation. To accomplish this, the locking pin preferably has a first end with an enlarged head and a second with a diametrically disposed aperture for receiving a hair pin or the like.

FIGS. 5 & 6 show a tarp 50 having a generally planar triangular configuration. The tarp includes a pair of beveled side edges. A plurality of linearly aligned and equally spaced grommets 52 are formed in the tarp along the side edges. Further, a plurality of rectangular cut outs 54 formed in the tarp along one of the beveled side edges and along a center bisecting line of the tarp. The tarp is adapted for being folded over the arms when in the angled orientation. As such, the cut outs receive the U-shaped handles of the arm assembly and the beveled side edges are connected via a piece of twine which is positioned through the grommets.

Finally, a sled assembly 56 is removably mounted to the bottom face of the base plate and extends between the wheels for use in snow. The sled assembly preferably includes an arcuate steel sled 58 with a uniform thickness along a length thereof. The sled preferably has a width equal to that of the base plate and a radius of curvature similar to the wheels. One end of the sled preferably has a sleeve 60 mounted thereon with a plurality of open spaces 62. While not shown, the cross bar of the base plate also has a sleeve mounted along a length thereof which is similar to that of the sled. When desired, the sleeve of the sled may be hingably coupled to the sleeve of the cross bar via a pin 64, as shown in FIG. 8. As an option, the sled further includes a spring 66 with a pair of ends which may be removably coupled to the bottom face of the base late via set screws or the like and depend downwardly for maintaining the sled coincident with an outer perimeter of the wheels. Note FIG. 9.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the cope of the invention.

We claim:

1. A collapsible game gurney system comprising, in combination:
   a base plate with a substantially planar square configuration defined by a top face, a bottom face and a periphery formed therebetween, the periphery comprising a front edge, a rear edge and a pair of side edges, the bottom face having a pair of posts coupled thereto adjacent to the rear edge and opposite side edges with a cross bar coupled between ends of the post for defining a channel;
   a support rack including a rectangular frame defined by a pair of elongated bars and a pair of short bars, the support rack further including a plurality of elongated cross members coupled between the short bars in parallel relationship, wherein one of the elongated bars of the support rack is coupled at a central extent thereof to the top face of the base plate along the rear edge thereof and extending outwardly therefrom in perpendicular relationship therewith, wherein the support rack has a length which is three times a length of the base plate;
   a wheel assembly including a hollow conduit coupled along the front edge of the base plate, an axle rotatably mounted within the conduit, and a pair of wheels coupled to ends of the axle for rotating therewith, the wheels each having a diameter less than a lateral width of the base plate;
   an arm assembly including a pair of elongated arms, each arm having a square cross-section along a length thereof, each arm having an outboard end with a handle mounted thereon and an inboard end hingably coupled to a pin extending from the bottom face of the base plate such that the arm extends through the channel, the arm assembly further including a plurality of braces each having a pair of linear rigid portions hingably coupled at first ends thereof and having second ends each hingably coupled to one of the arms for pivoting with the arms and remaining in coplanar relationship therewith, a central shaft coupled between centers of the braces and extending through the channel, and a plurality of U-shaped handles mounted along outer surfaces of the arms, wherein the arms are adapted to pivot between a parallel orientation and an angled orientation forming an acute angle, wherein the arm assembly further includes a locking pin for being removably secured within bores formed in the outboard ends of the arms for maintaining the arms in the parallel orientation;
   a tarp having a generally planar triangular configuration and including a pair of beveled side edges, a plurality of linearly aligned and equally spaced grommets formed in the tarp along the beveled side edges, and a plurality of rectangular cut outs formed in the tarp along one of the beveled side edges and along a center bisecting line of the tarp, wherein the tarp is adapted for being folded over the arms when the arms are in the angled orientation such that the cut outs receive the U-shaped handles of the arm assembly and the beveled side edges are connected via a piece of twine which is positioned through the grommets; and
   a sled assembly removably mounted to the bottom face of the base plate and extending between the wheels.

2. A collapsible game gurney system comprising:
   a base;
   a wheel assembly mounted on the base, the wheel assembly comprising a pair of laterally-spaced wheels for enhancing lateral stability of the base as the base and wheel assembly is moved across a ground surface, each wheel being located laterally outward from the base;
   an arm assembly including a pair of elongated arms each having an outboard end forming a handle for gripping by a user and an inboard end pivotally mounted to the base for pivoting between a substantially parallel orientation and an angled orientation, at least one brace extending between the arms and including a pair of pivotally connected brace portions permitting the brace to extend between the arms at all positions of the arms between the substantially parallel and angle orientations such that the spacing between the handles of the arms may be adjusted;
   a tarp removably mounted between the arms of the arm assembly for supporting game thereon; and
   a sled assembly including an arcuate sled plate having a front edge pivotally mounted on the base plate and a rear edge being free, and a spring for biasing the sled plate outwardly away from the base plate.

3. A collapsible game gurney system as set forth in claim 2 wherein the brace lies in coplanar relationship with the arms.

4. A collapsible game gurney system as set forth in claim 2 wherein the arms each have a plurality of handles mounted along an outer surface thereof.

5. A collapsible game gurney system as set forth in claim 2 wherein the tarp removably encompasses the arms the tarp having beveled side edges.

6. A collapsible game gurney system as set forth in claim 2 wherein a support rack is mounted to the base and extends therefrom in a plane which is substantially perpendicular with respect to a plane including the arms of the arm assembly.

7. A collapsible game gurney system as set forth in claim 2 and further including a lock for securing the arms of the arm assembly in the substantially parallel orientation.

8. A collapsible game gurney system as set forth in claim 2 and further including a sled removably mounted to the base.

9. A collapsible game gurney system as set forth in claim 2 wherein the arms of the arm assembly are each pivotally mounted to the base at a pivot point, the pivot points being separated by a first distance, the wheels being separated by a second distance, the second distance being approximately twice the first distance to minimize a lateral width of the wheels for facilitating movement of the wheel assembly through underbrush.

10. A collapsible game gurney system as set forth in claim 2 wherein a lateral width between the handles of the arms is less than a lateral width between the wheels when the arms are in the substantially parallel orientation, and wherein a lateral width between the handle of the arms is about five times the lateral width between the wheels when the arms are in the angled orientation.

* * * * *